(12) United States Patent
Singh et al.

(10) Patent No.: US 10,891,193 B2
(45) Date of Patent: Jan. 12, 2021

(54) APPLICATION HEALTH MONITORING AND AUTOMATIC REMEDIATION

(71) Applicant: ACCENTURE GLOBAL SOLUTIONS LIMITED, Dublin (IE)

(72) Inventors: Jaskaran Singh, Mohali (IN); Tishir Singh, Kanpur (IN)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 113 days.

(21) Appl. No.: 16/238,306

(22) Filed: Jan. 2, 2019

(65) Prior Publication Data

US 2020/0210293 A1    Jul. 2, 2020

(51) Int. Cl.
*G06F 11/14* (2006.01)
*G06F 11/07* (2006.01)

(52) U.S. Cl.
CPC ........ *G06F 11/1438* (2013.01); *G06F 11/076* (2013.01); *G06F 11/0769* (2013.01); *G06F 2201/87* (2013.01)

(58) Field of Classification Search
CPC ............ G06F 11/0748; G06F 11/0793; G06F 11/0709; G06F 11/0775; G06F 11/3006; G06F 11/301; G06F 11/3051; G06F 11/3055; G06F 11/3447
See application file for complete search history.

(56) References Cited

U.S. PATENT DOCUMENTS

| | | | | |
|---|---|---|---|---|
| 5,715,386 A * | 2/1998 | Fulton, III | .......... | G06F 11/1438 714/15 |
| 6,145,089 A * | 11/2000 | Le | .......... | G06F 11/008 714/4.4 |
| 6,256,641 B1 * | 7/2001 | Kasi | .......... | G06F 11/1482 |
| 6,467,050 B1 * | 10/2002 | Keung | .......... | G06F 11/0709 707/999.202 |
| 10,445,197 B1 * | 10/2019 | Harpreet | .......... | H04L 41/0654 |
| 2006/0200450 A1 * | 9/2006 | Keane | .......... | G06F 16/284 |
| 2008/0120690 A1 * | 5/2008 | Norlander | .......... | G06F 21/57 726/1 |
| 2013/0262918 A1 * | 10/2013 | Nation | .......... | G06F 11/079 714/5.1 |

* cited by examiner

*Primary Examiner* — Nadeem Iqbal
(74) *Attorney, Agent, or Firm* — Mannava & Kang, P.C.

(57) ABSTRACT

An application health monitoring system automatically resolves anomalies arising among clients of a messaging server. The messaging server clients (MSCs) include one or more applications and services included in the applications. The anomalies include MSC anomalies and process starter anomalies. When a messaging session is disconnected due to server restarts, the service may be automatically restarted a predetermined number of times to re-establish the connection. Similarly, if a process starter of a service fails to start up properly, the service can be automatically restarted a predetermined number of times before the anomaly is flagged for human review. The monitoring system also automatically implements rules whenever service configurations are changed in addition to validating web service ports and cloud provider queues.

20 Claims, 11 Drawing Sheets

APPLICATION HEALTH MONITORING AND AUTOMATIC REMEDIATION

BACKGROUND

Organizations often have a diverse set of systems, each producing their own output. Tracking the output of various processes enables monitoring performances of the various systems. Application health monitoring can include checks for various aspects of the application environment such as, whether the application is running, the amount of resources used by the application like Central Processing Unit (CPU)/memory/network usage, reporting of any unhandled exceptions, status of various modules where applicable and status of various external components e.g., databases, web services, file servers etc. Application health monitoring can also include keep track of background tasks and reporting statistics on the usage of various functionalities of the application. However, many application monitoring systems require detailed review of server logs for the identification of anomalies.

BRIEF DESCRIPTION OF DRAWINGS

Features of the present disclosure are illustrated by way of examples shown in the following figures. In the following figures, like numerals indicate like elements, in which.

DETAILED DESCRIPTION

Figure 1:
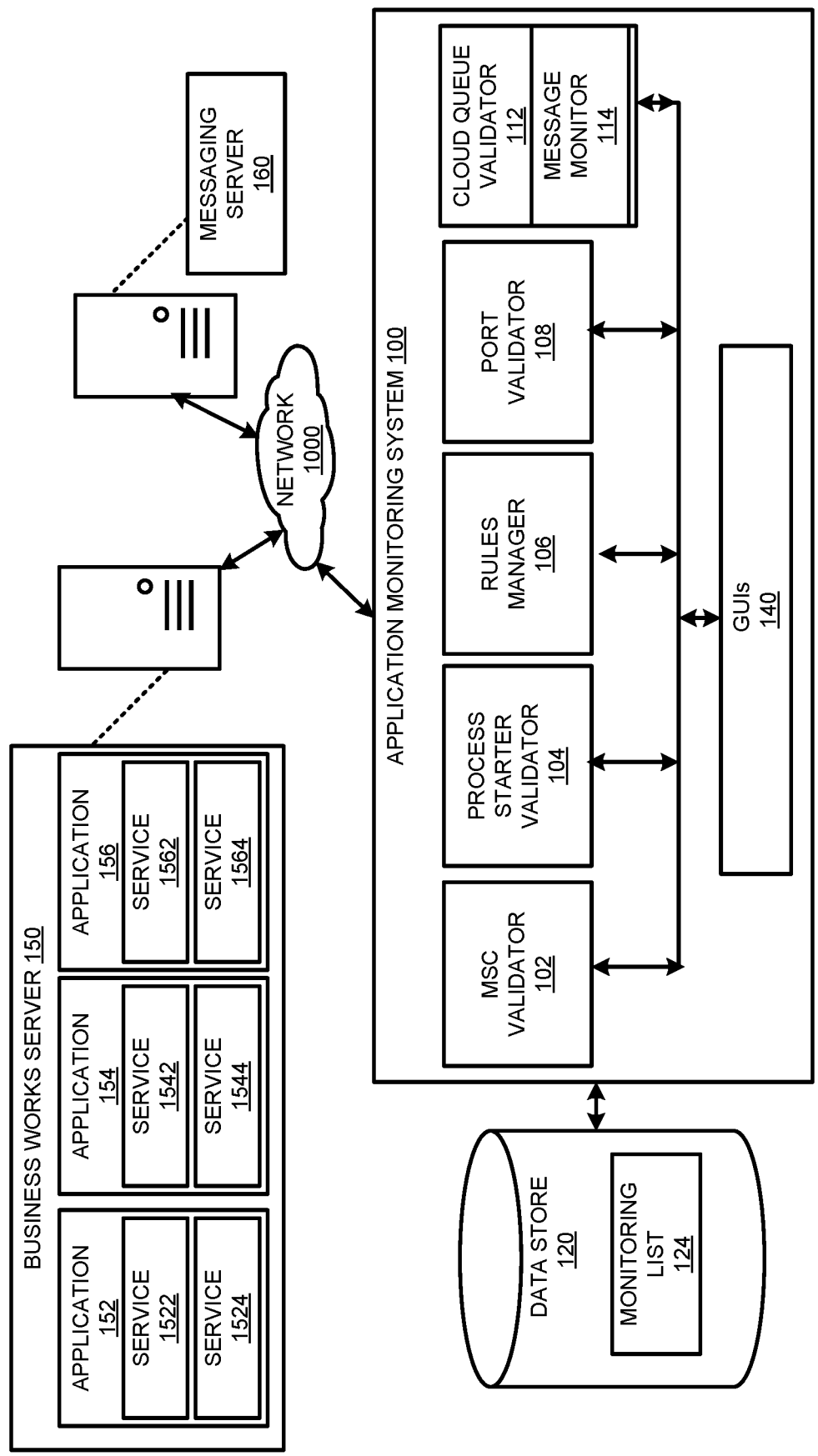
FIG. 1 is a block diagram that shows an application health monitoring system in accordance with examples disclosed herein.

For simplicity and illustrative purposes, the present disclosure is described by referring to examples thereof. In the following description, numerous specific details are set forth in order to provide a thorough understanding of the present disclosure. It will be readily apparent however that the present disclosure may be practiced without limitation to these specific details. In other instances, some methods and structures have not been described in detail so as not to unnecessarily obscure the present disclosure. Throughout the present disclosure, the terms "a" and "an" are intended to denote at least one of a particular element. As used herein, the term "includes" means includes but not limited to, the term "including" means including but not limited to. The term "based on" means based at least in part on.

An application health monitoring system that automatically resolves anomalies is disclosed herein. The monitoring system is configured to monitor a business works server and a messaging server. The business works server hosts a plurality of applications wherein each application further includes one or more services. A service can represent a discrete unit of functionality that can be accessed, acted upon and updated by another entity communicatively coupled to the application including the service. Different services can be used in conjunction to provide functionality of a large software application. One or more of the applications and the services act as messaging server clients (MSCs) consumers or queue receivers for the messaging server. Each of the services may further include one or more process starters which can include global classes or modules that further comprise methods, variables to be initiated etc. when a service is initially started up. The monitoring system can be configured to validate various entities such as, one or more of the consumers, the process starters, service ports and cloud provider queues. The validation of various entities can be configured as recurring processes which occur at specific scheduled times or on demand. The monitoring system further includes a rule manager that automatically generates rules based on service configuration changes.

When validating the MSCs, the current state or a runtime of the MSCs is initially obtained. A standard state for the MSCs can be initially defined. A MSC comparison report is generated comparing the standard state with the respective current states of each of the MSCs in order to identify MSC anomalies. The MSC anomalies can include sessions that were disconnected when one or more of the business works server or the messaging server is restarted. The service(s) associated with the disconnected sessions are restarted and the MSC comparison report is again generated to detect if the anomalies are resolved. If the MSC anomalies remain unresolved, the service is again restarted. The monitoring system iterates over the generation of the MSC comparison reports and the service restarts a predetermined number of times. If the MSC anomalies remain unresolved at the end of the predetermined number of iterations, the anomalies are flagged for human review.

Similarly, the process starters of the various services on the business works server are also validated. Again, a respective standard state is defined for each of the process starters wherein the environment including the business works server and the messaging server are stable. A process starter comparison report comparing the runtime state of the environment during a scheduled run with the standard state is generated. Anomalies such as process starters that did not start properly in order to provide the requisite functionality or that are displayed on an administrative user interface in a disabled state while functioning in the background etc. are identified. The services corresponding to the process starters associated with the process starter anomalies are automatically restarted. The process starter comparison report is again generated to determine if the process starter anomalies remain unresolved. If one or more of the process starter anomalies are unresolved, the services are again restarted. The monitoring system iterates over the process starter comparison report generation and the service restarts for a predetermined number of times, such as, three times. If at the end of the iterations, the process starter anomalies remain unresolved, then the process starter anomalies are flagged for manual intervention by a support team.

The monitoring system further enables automatic rule implementation for service configuration changes. For example, when new services are added to the business works server or when service names are changed, new rules need to be implemented. The changes to the services are added to a monitoring list. The monitoring system accesses the monitoring list and programmatically applies the rules on each service which is in a stopped state.

Another validation offered by the monitoring system includes validation of web service ports. A web service generally runs on a particular, predefined, allocated port number which can be unique for that web service. The monitoring system includes custom code which is used to identify if a particular web service from the multiple services associated with the business works server is running on a respective, allocated port. The custom code checks if the hypertext transfer protocol (HTTP) connection for that web service is being made using the respective, allocated port number. If the respective, allocated port number is used for the web service, then it is determined that the web service is running as configured. If however, the connection for the web service does not use the respective, allocated port number, the web service may not be running or the web service is not running as configured.

In some examples, one or more of the applications on the business works server may be using services from a cloud provider. As the applications implement a subscribe-publish messaging protocol, the applications may be MSCs for messages from a cloud service provider queue. Accordingly, the monitoring application also includes a cloud queue validator. The cloud validator also includes custom code that monitors the cloud queue messages. Corrective actions can be implemented based on the importance of the messages.

The monitoring system as disclosed herein provides a technical solution to automating resolution of anomalies. Current techniques for monitoring of application states in the business works server requires a support team member to review application logs. As a result, obtaining application states is time consuming and prone to human errors. For example, in some instances it may happen that when a service or a business works server is restarted, the process starters may not be properly initiated resulting in unavailability of certain application functions. Similarly, monitoring the MSCs of message receivers from the messaging server requires a manual review of the service logs in order to determine the connection status of the various MSCs. Again, such manual review of service logs is a time consuming process and is also prone to human errors. As a result, conventional techniques for monitoring application states in business works servers and for MSC applications cannot be performed in real-time and introduce errors that degrade system performance and can require further efforts to remediate.

In contrast to conventional techniques, the monitoring system disclosed herein uses computer-implemented operations to execute real-time monitoring activities thereby removing delays and mitigating errors associated with conventional monitoring techniques. The monitoring system disclosed herein provides a predefined standard state for the MSCs thereby enabling generation of the comparison report and enabling automatic resolution of anomalies that may occur during messaging sessions. Similarly, the monitoring system provides validation for the process starters by defining a standard state for each of the process starters thereby enabling automatic resolution of the anomalies. The monitoring system further improves the working of the business works server by providing automatic rule implementation via the monitoring list thereby saving manual effort in managing the rule files and support efforts in creating new rule files. The monitoring system thereby provides for consistent activity monitoring processes that are beneficial in distributed environments such as those described herein where there is no centralized control system.

FIG. 1 is a block diagram that shows an application health monitoring system 100 in accordance with examples disclosed herein. The monitoring system 100 includes a MSC validator 102, a process starter validator 104, a rules manager 106, a port validator 108 and a cloud queue validator 112. The monitoring system 100 is communicatively coupled to a plurality of applications 152, 154 and 156 hosted on one or more servers such as but not limited to a business works server 150 connected to a network 1000 such as the Internet. In an example, the plurality of applications 152, 154 and 156 can be based on service-oriented architecture. Accordingly, each of the plurality of applications 152, 154 and 156 can further include one or more component services. For example, the application 152 can include component services 1522 and 1524; the application 154 includes component services 1542 and 1544 and the application 156 includes component services 1562 and 1564. It may be appreciated that only three applications with two services each are shown for illustration; however, other implementations may include any number of applications with any number of services can be similarly connected for monitoring and automatic remediation by the monitoring system 100. Moreover, the plurality of applications 152-156 can be distributed applications hosted on multiple servers at various geographic locations. The monitoring system 100 and the business works server 150 can be communicatively coupled a messaging server 160 that enables exchange of messages between the plurality of applications 152, 154, 156 and their component services 1522, 1524, 1542, 1544, 1562 and 1564 with other network elements connected to the network 1000.

The messaging server 160 can implement a publish-subscribe protocol for message exchange. The plurality of applications 152-156 and their component services 1522-1564 act as MSCs subscribing to receive the messages from the message server 160. Message exchange between the messaging server 160 and a MSC may be disconnected due to conditions such as bad connectivity or server overload, etc. Therefore, the MSC validator 102 initially checks the service logs of the messaging server 160 to get the connection status of the MSCs. When done manually, such log check may not only be laborious but may lead to further errors. The MSC validator 102 can compare the run time state of the MSCs with a predefined standard state to identify anomalies such as disconnected sessions. When an anomaly is identified, automatic remediation can be implemented. In an example, one standard state can be defined for the various MSCs of the messaging server 160.

The process starter validator 104 serves to impose another check on the MSCs via validating the process starters within the services. In an example, the process starters can include Java classes that provide interfaces for the applications 152-156 on the business works server 150. Process starters such as web services or other queue receivers can be included in the services 1522-1564. Each of the services 1522-1564 can have different number of process starters. Additionally, the services 1522-1564 may also have different types of process starters. The process starters are called when a process engine starts up and enable initializing resource connectors, load and initialize global instances. A start method in a process starter serves to activate the process starter. Event notifier or other resource observer code is also activated so that a process instance can be stared.

Currently existing techniques for monitoring the services 1522-1564 after patching or server restart, require that the service logs should be checked to get the health status of the services. Again, checking the service logs is a time-consuming process that is prone to errors. The process starter validator 104 in accordance with the examples disclosed herein compares a current state of the process starters associated with the services 1522-1564 to predefined standard states corresponding to each of the services 1522-1564 to automatically identify process starter anomalies. In an example, separate standard states may be defined for each of the services 1522-1564 as each service has different number of and different types of process starters. If any anomalies are identified, automatic remediation such as restarting a service can be implemented. In an example, a user may define the standard state that is used for the comparison purposes. Different services may have different standard states. Moreover, the monitoring system 100 also enables user changes to a predefined standard state.

The monitoring system 100 can programmatically apply mrules which may be stored in rule base. The rules can include a set of actions that are to be executed by the applications 152-156 when one or more of the services 1522-1564 is in a stopped state. In an example, the rules may be coded as Java programs. Some of the rules may be repetitive in nature. The rules can be user defined in that the rules can check for specific conditions and execute one or more actions based on the conditions. Different services can be monitored and/or managed by a corresponding set of rules. Whenever new services are added, the rules need to be enabled for the new services. Similarly, if changes are made to the existing services some maintenance tasks may be required for updating the rules accordingly. Whenever new rules are created, a rule file is added. By way of illustration and not limitation, the rules may be based on certain keywords so that an alert is generated when the keyword is encountered in a log file. The rules manager 106 enables automatically generating the rules for new services and/or when changes are made to the existing rules. When a new service is enabled on the business works server 150, the new service is automatically added to a monitoring list 124. The monitoring list 124 includes a list of services e.g., 1522-1564 on which one or more of the rules can be applied. In order for a rule to be generated, the newly added service or the updated service is included in the dynamically updatable monitoring list 124 so that the effort in creating a file each time a new service is added can be mitigated. The rule manager 106 can be programmed to check the monitoring list 124 and apply the rules on each service in the monitoring list 124 that is in a stopped state. In addition, the rules manager 106 can be associated with one of the GUIs 140 which provides for enabling and/or disabling the rules.

In some instances, a service associated with one of the applications 152-156 may be shown as running on an administrator screen associated with the business works server 150. However, it may not actually be running in the backend. The port validator 108 is a tool that validates the ports for each of the services 1522-1564 and provides a report on such anomalies. More particularly, the port validator 108 includes custom code that can connect to the specific server (e.g., the business works server 150) and the port number to confirm if the service is properly running.

The monitoring system 100 also includes a cloud queue validator 112 that enables monitoring queues of cloud services such as the Amazon Web Services AWS. The cloud queue validator 112 monitors the messages on the queue of the cloud service provider if any of the plurality of applications 152-156 such as application 152 for example, interface with entities on the cloud. Monitoring the cloud service provider queue helps in the maintenance of the application 152 that interfaces with the entities on the cloud. Accordingly, the cloud queue validator can include a message monitor 114 that monitors messages to and from a cloud service provider queue. In case the queue of the cloud service provider is working smoothly without errors, then connections can be successfully established with the entities on the cloud. The message monitor 114 detects any errors in connecting to the queue of the cloud service provider. In an example, an email alert can be sent by the message monitor to the cloud service provider upon the detecting one or more errors in the connections to the cloud service provider queue.

By the way of illustration and not limitation, an example implementation of the monitoring system 100 is described herein. Examples of the business works server 150 can include Tibco™ Business Works Server while Tibco™ Enterprise Message (EMS) Server can be used as the messaging server 160. The rule manager 106 can be implemented via a Hawk console. Examples of a front end of the monitoring system 100 can be built on JavaServer Pages (JSPs) on a Tomcat™ server. Processing in the monitoring system 100 can be implemented using core Java/JSP. The monitoring system 100 can interface with various cloud systems such as but not limited to, Amazon Web Services (AWS™) or Microsoft Azure for implementing the various functionalities described herein.

Figure 2:
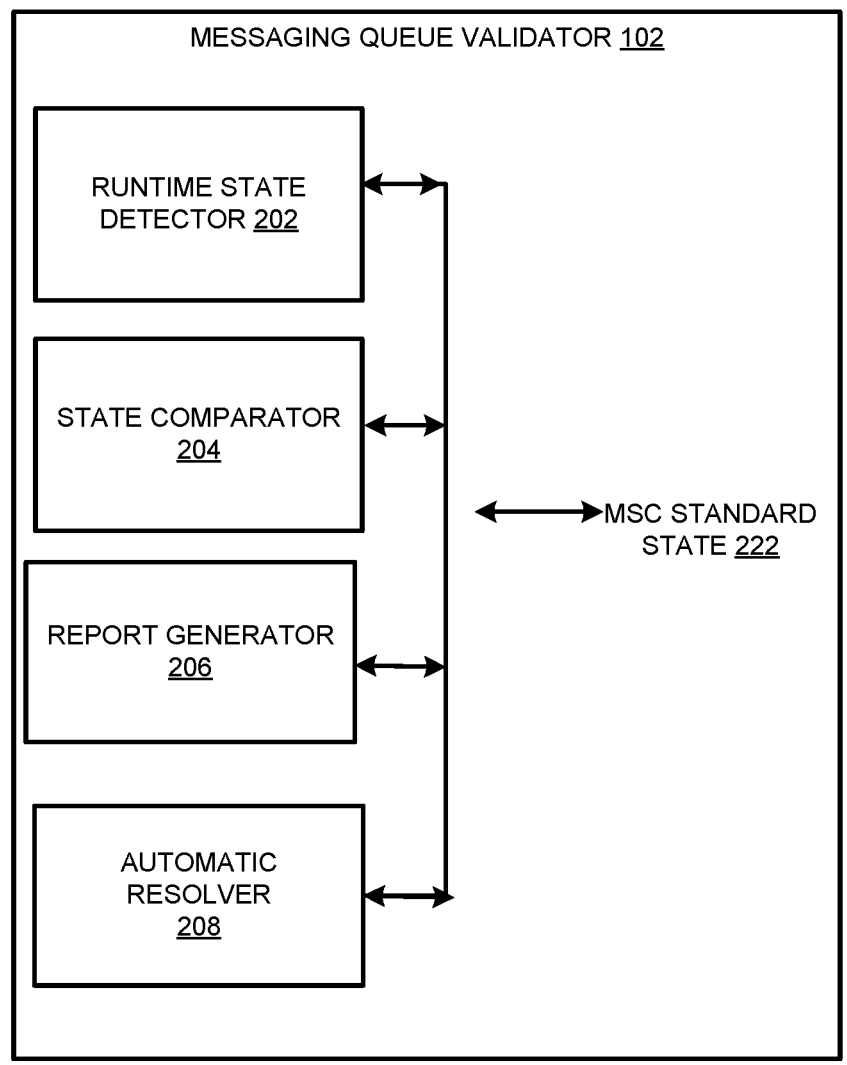
FIG. 2 shows a block diagram of a consumer validator in accordance with the examples disclosed herein.

FIG. 2 shows a block diagram of the MSC validator 102 in accordance with the examples disclosed herein. The MSC validator 102 includes a runtime state detector 202, a state comparator 204, a report generator 206 and an automatic resolver 208. When one or more of the business works server 150 or the messaging server 160 is restarted, many connections to the applications 152-156 may be disconnected. In order to avoid such disconnections, the MSC validator 102 maintains a check on the MSCs of the messaging queues. Accordingly, the runtime state detector 202 initially detects the runtime state or the current states of the MSCs that receive messages from the messaging server 160. As mentioned above, the MSCs can include one or more of the applications 152-156 and the component services 1522-1564. A message can be sent to a messaging queue of the messaging server 160 by a messaging client (e.g., an external system) and a MSC of that queue can receive that message.

In an example, the MSC validator 102 can be built on Java and enable defining a MSC standard state 222 for the messaging queue MSCs via one of the GUIs 140. The standard state of a MSC may be defined by assigning specific values to various properties of the MSC. The state comparator 204 compares the current states of the MSCs with the MSC standard state 222. The state comparator 204 can execute a textual, character or numeric comparison to determine if the current state of a MSC is the same as the standard state. Any disparity between the attribute values of one of the current states of the MSC from the standard state can be flagged as a MSC anomaly. In an example, a disconnected messaging session may be flagged as a MSC anomaly that requires remediation.

When a MSC anomaly is detected on comparing the current state with the standard state, a MSC comparison report regarding the MSC anomaly can be generated by the report generator 206. On receiving the MSC comparison report, the automatic resolver 208 can execute automatic actions to resolve the MSC anomaly. For example, if the MSC anomaly pertains to a disconnected session, the automatic resolver 208 may restart the service associated with the disconnected session thereby re-establishing the connection. The MSC validator 102 can therefore be used to save the effort in manually verifying the service logs to locate connection errors.

Figure 3:
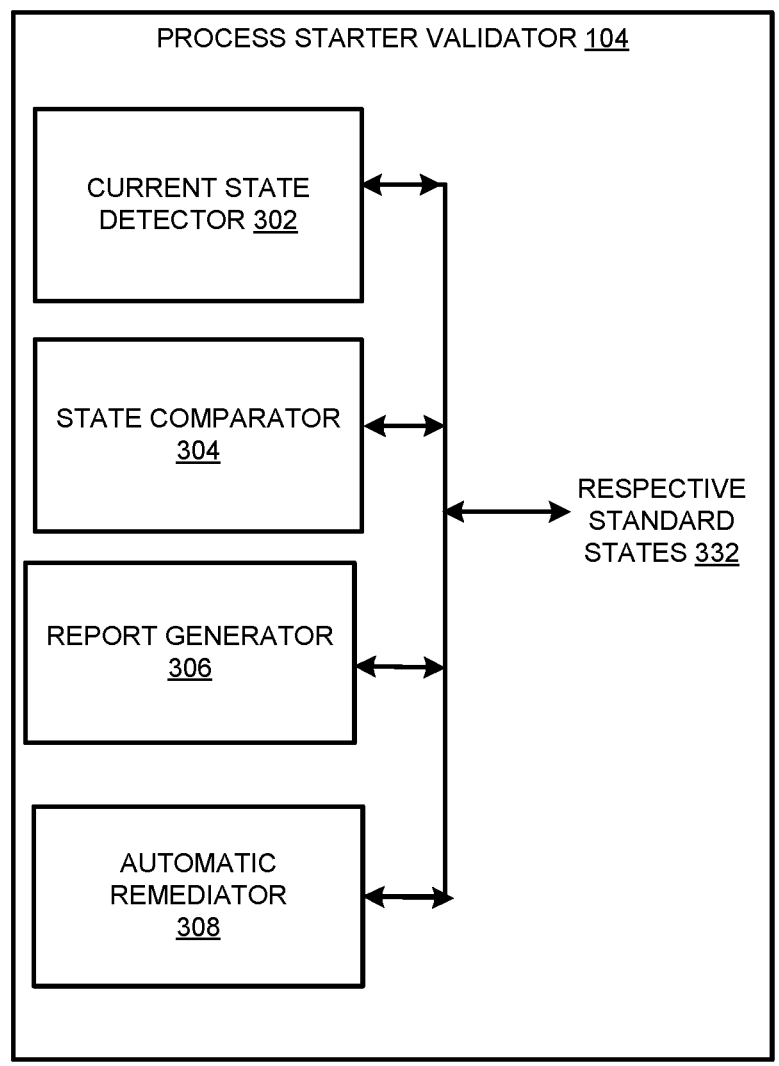
FIG. 3 shows a block diagram of a process starter validator in accordance with the examples disclosed herein.

FIG. 3 shows a block diagram of the process starter validator 104 in accordance with the examples disclosed herein. The process starter validator 104 includes a current state detector 302, a state comparator 304, a report generator 306 and an automatic remediator 308. Each of the services 1522-1564 can include one or more process starters. Accordingly, when a service e.g., the service 1522 is running, the corresponding process starters need to be enabled. In some instances wherein a server is restarted, the services may not start properly as required. This can happen in some instances if one or more of the process starters of the service come up in a disabled state. The process starter validator 104 mitigates the need to manually check the logs for each process starter of each service. In an example, the process starter validator 104 can be built on Java.

The current state detector 302 detects the current state of the various process starters associated with the services 1522-1564. The current states of the process starters can be compared to respective standard states 332. The standard states 332 can be defined by a user by employing one of the GUIs 140. The state comparator 304 compares the current states of the process starters with the respective standard states 332 to identify one or more process starter anomalies. The report generator 306 generates a process starter anomaly report including any identified process starter anomalies. The process starter anomaly report can be transmitted to the automatic remediator 308. Based on the particular process starters included in the process starter anomaly report, the automatic remediator 308 may restart the particular services. In an example, the process starter anomaly report is again generated in order to determine if the process starter anomalies are resolved. If the process starter anomalies are not resolved, the services may be restarted again. This remediation can be implemented a predetermined number of times, for example, three times, before the process starter anomalies are flagged for human review.

Figure 4:
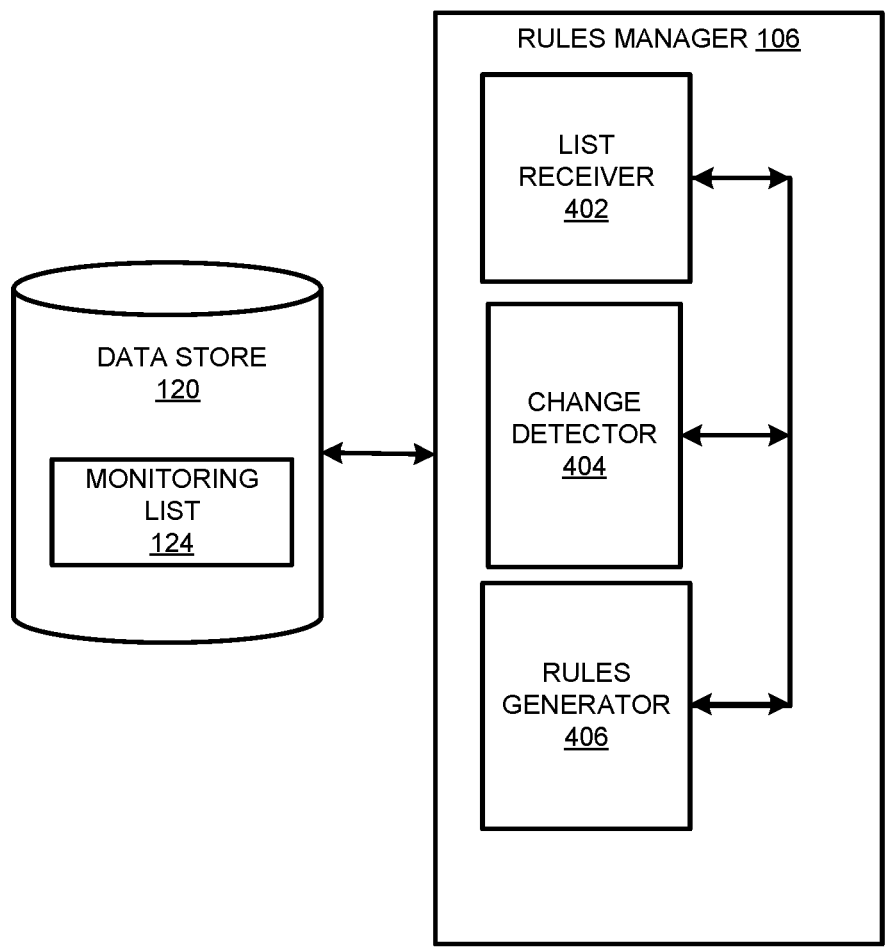
FIG. 4 is a block diagram of a rules manager in accordance with the examples disclosed herein.

FIG. 4 is a block diagram of the rules manager 106 in accordance with the examples disclosed herein. The rules manager 106 includes a list receiver 402, a change detector 404 and a rule generator 406. Generally monitoring rules are created manually using one of the GUIs 140. For every new service that is added or any change that is made to a service name, a new rule needs to be added using the GUI. The rules manager 106 helps in automatically creating the new rules whenever a new service is added or a service name is changed.

The list receiver 402 can be programmed to access the monitoring list 124 periodically, for example. In an example, a JSP page can be dynamically checked by the list receiver 402. The change detector 404 detects changes to service configurations of the business works server 150. Addition of a new service or modifications to an existing service are detected by the change detector 404 via the monitoring list 124. In an example, the monitoring list 124 can be a comma separated list. Each line of the monitoring list 124 can have a service name and state separated by a comma. Example monitoring list data is shown below:

Service1, Enable
Service2, Disable
Service3, Disable
Service4, Enable . . . .

More particularly, if a new service is added to one of the applications 152-156, it is dynamically updated to the monitoring list 124. The rule generator 406 can be programmed to apply the rules on each service in the monitoring list 124 that is in a stopped/disabled state. In an example, the rules manager can provide a check box on one of the GUIs 140 that display the monitoring list to enable or disable a given rule for a particular service.

Figure 5A:
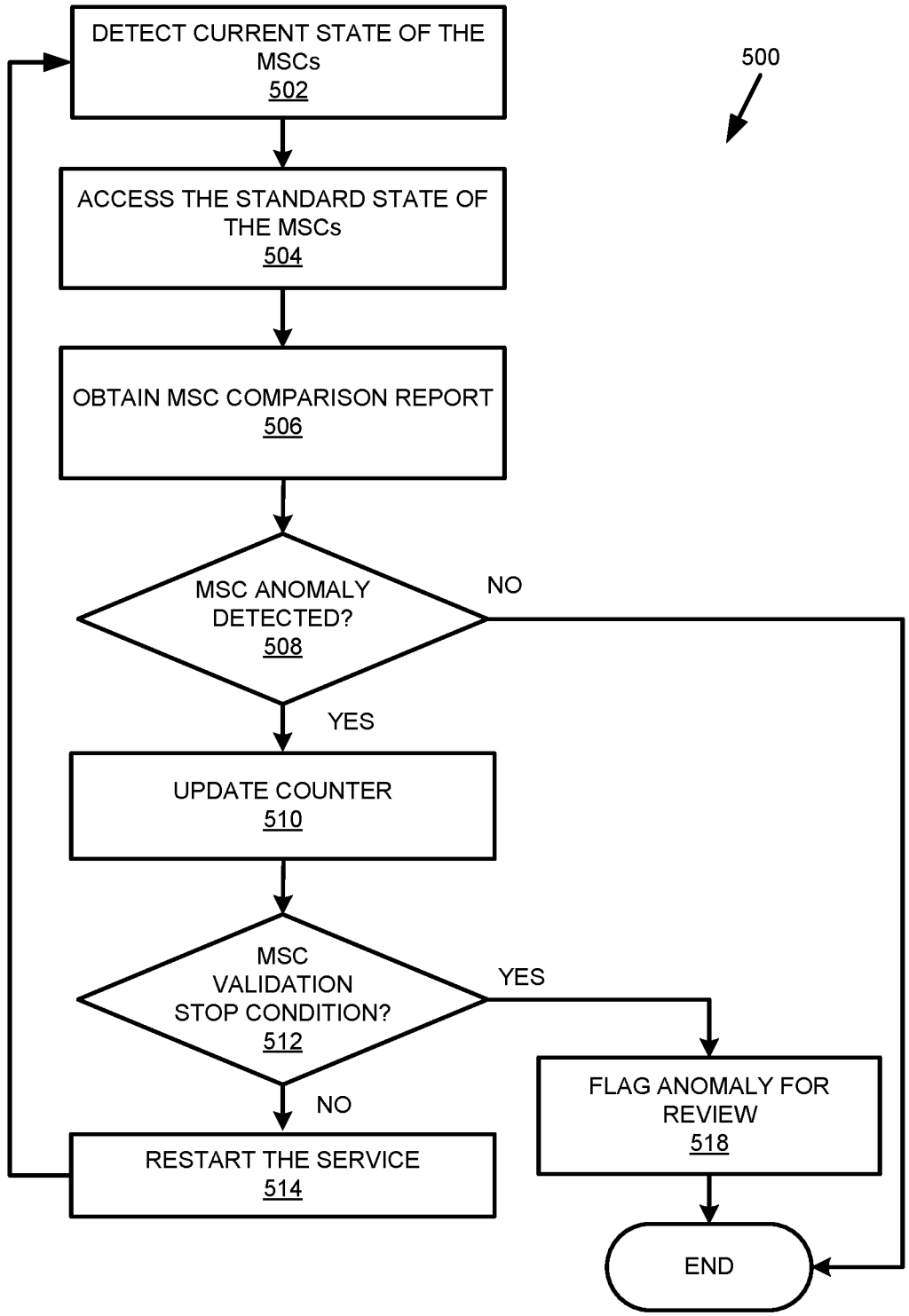
FIG. 5A shows a flowchart that details a method of monitoring an application for validating consumers in accordance with the examples disclosed herein.

FIG. 5A shows a flowchart 500 that details a method of monitoring applications for MSC validation in accordance with the examples disclosed herein. The method begins with detecting a current state of the MSCs at 502. On obtaining the current state of the MSCs, the corresponding standard state of the MSCs is accessed at 504. As mentioned herein, the standard state can be user-defined and indicates the various attribute values that are to be maintained for a stable environment in the business works server 150. Based on the requirements, the standard state may be changed by the user. A MSC comparison report, comparing the current states of the MSCs with the standard state is obtained at 506. At 508, a determination is made as to whether any MSC anomalies are detected. If no MSC anomalies are detected at 508, the method terminates on the end block. If MSC anomalies are detected, e.g., one or more MSCs are down or a disconnected messaging session is detected, the method proceeds to 510 wherein a counter is updated. Further at 512, it is determined if a MSC validation stop condition is detected. A MSC validation stop condition can be detected if the MSC anomaly detection and restarting of the service has already been repeated a predetermined number of times. When a MSC validation stop condition not is detected at 512, the method moves to 514 wherein the service is restarted in order to establish connections with the MSC which, in this instance, is the service that was restarted. The method then returns to 502, from step 514, to obtain the current state of the MSCs During the next iteration, it is again determined at 512 if the MSC validation stop condition is met. If it is determined at 512 that the MSC validation stop condition is not met the service is restarted at 514 and the process flows as describe above. If the service has already been updated a predetermined number of times e.g., three times, then the MSC validation stop condition is met at 512. At this point, the MSC anomaly is not resolved and the MSC validation stop condition is reached. Therefore, the MSC anomaly is flagged for human review at 518 and the method terminates on the end block.

Figure 5B:
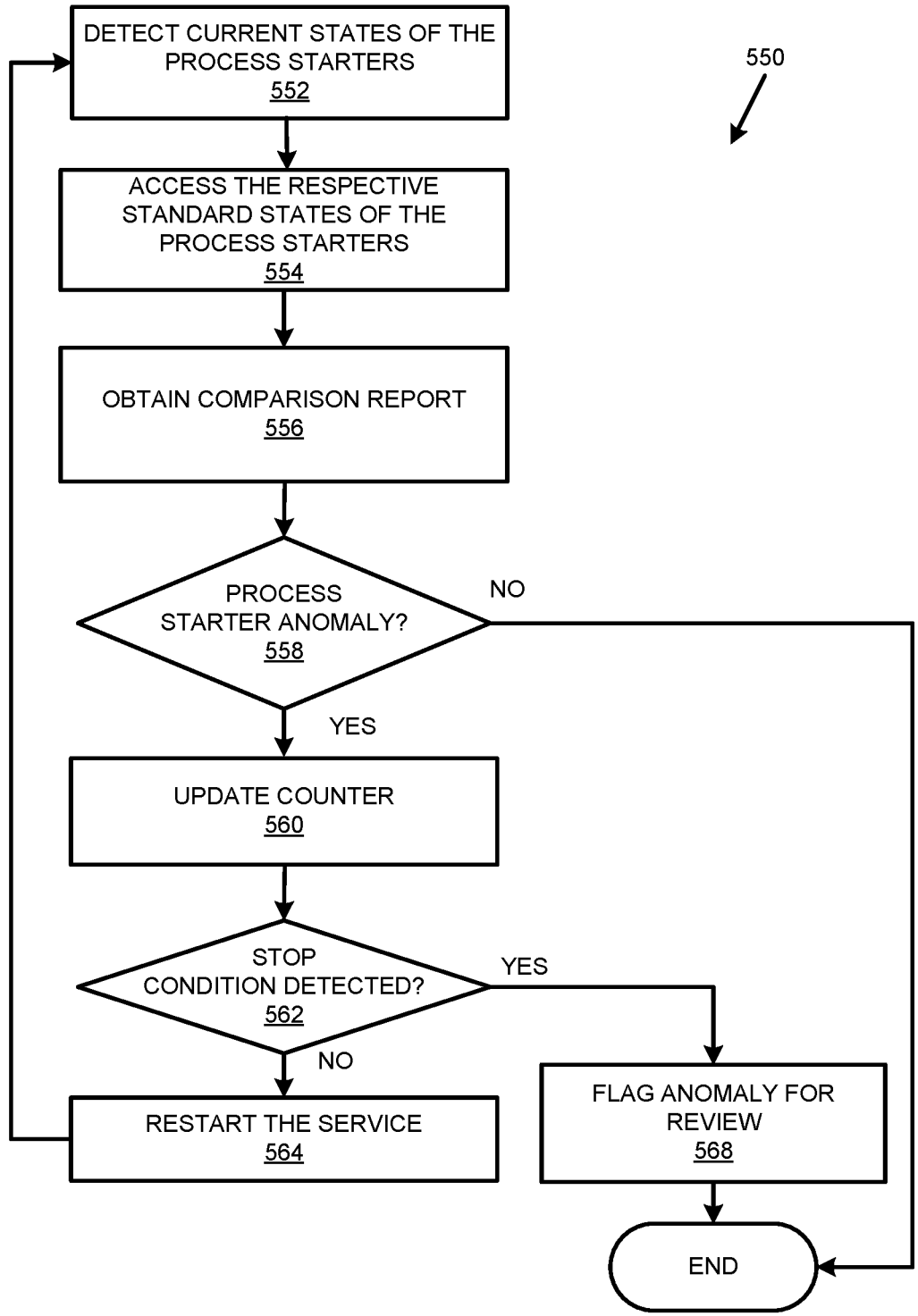
FIG. 5B shows a flowchart that details a method of monitoring an application for validating process starters in accordance with the examples disclosed herein.

Monitoring of the process starters can occur in a manner similar to the MSCs as described above with identifying process starter anomalies. FIG. 5B shows a flowchart 550 that details a method of monitoring an application for process starter validation in accordance with the examples disclosed herein. The method begins with detecting a current state of the process starters at 552. On obtaining the current state of the process starters, the respective standard states of the process starters is accessed at 554. As different services 1542-1564 have different types of process starters, each process starter can have a respective standard state that is user-defined. A respective standard state of a process starter indicates the various attribute values that are to be maintained for a stable environment in the business works server 150. Based on the requirements, the standard state of a process starter may be changed by the user. A process starter comparison report, comparing the current states of the process starters with their respective standard states is obtained at 556. At 558 it is determined if one or more process starter anomalies are detected. If no process starter anomalies are detected at 558, the method terminates on the end block.

If the process starter anomalies e.g., one or more process starters are down or a situation wherein one or more process starters do not start up properly is detected at 558, the method proceeds to 560 where a counter is updated. When process starters don't start properly, the corresponding service and thereby the application including the service may not function as intended or the corresponding functionality of the application is not available. Further at 562, it is determined if a process starter validation stop condition is detected. A process starter validation stop condition can be detected if the process starter anomaly detection and restarting of the service has already been repeated a predetermined number of times. If the process starter validation stop condition is not detected, the method moves to 564 wherein the service(s) including the process starters associated with the process starter anomalies are restarted.

Upon restarting the service, the method returns to 552 to obtain the current states of the process starters after restarting the service. The process starter comparison report is again generated at 554 and it is determined if any further process starter anomalies remain to be resolved. If there are no further process starter anomalies to be resolved, the method terminates on the end block. If however, one or more of the process starter anomalies are unresolved, the method moves to updating the counter at 560.

It is determined at 562 if the process starter validation stop condition is met. If it is determined at 562 that the process starter validation stop condition is not met, the service is restarted at 564 and the process flows as describe above. If the service has already been restarted a predetermined number of times e.g., three times, then the process starter validation stop condition is met at 562. At this point, the process starter anomaly is not resolved and the process starter validation stop condition is reached. Therefore, the process starter anomaly is flagged for human review at 568 and the method terminates on the end block.

Figure 6:
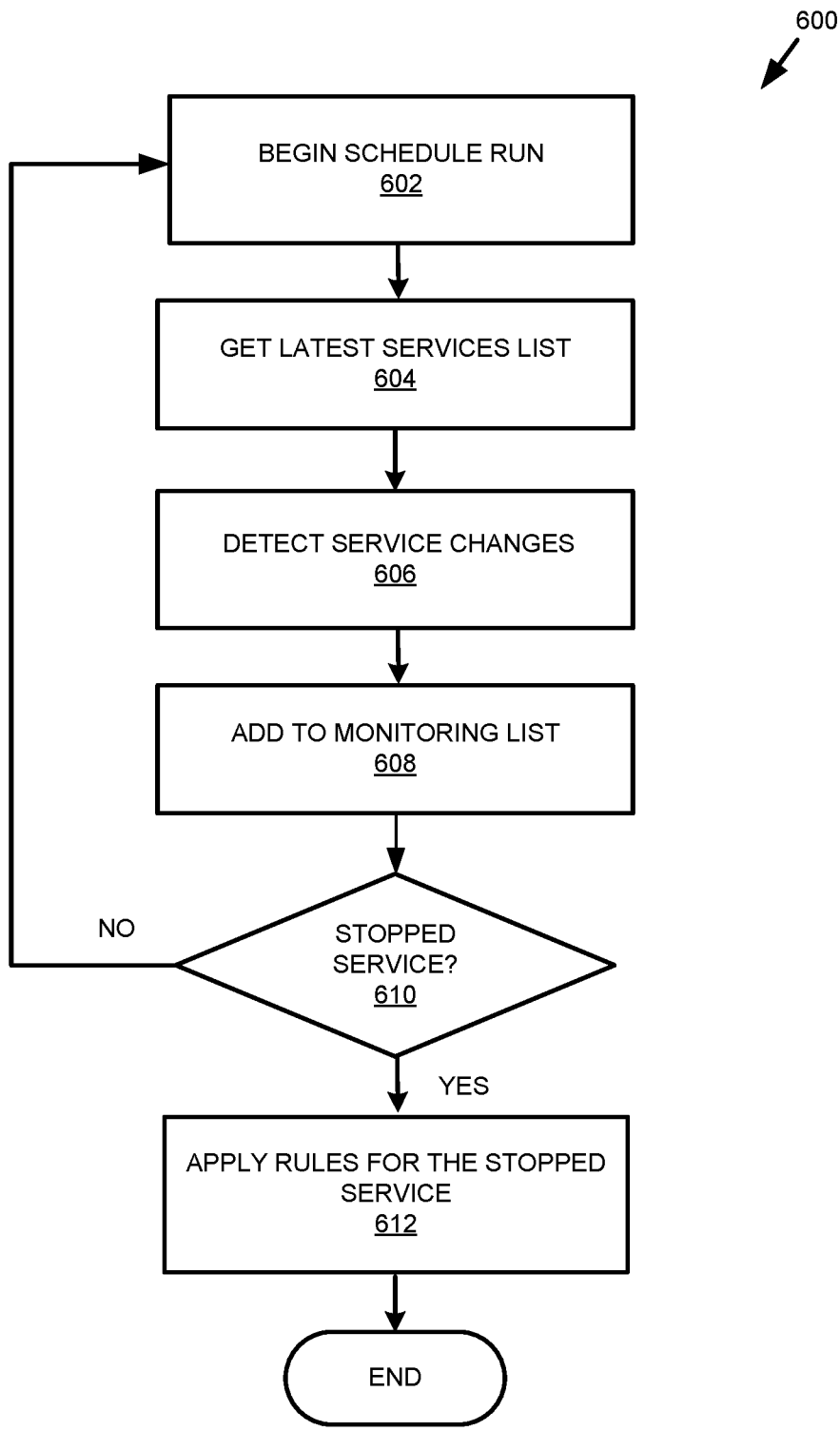
FIG. 6 shows a flowchart that details generating rules in accordance with the examples disclosed herein.

FIG. 6 shows a flowchart 600 that details generating rules in accordance with the examples disclosed herein. As mentioned above, the list receiver 402 periodically accesses a list of the services on the business works server 150 to determine any service configuration changes. Accordingly, a schedule run to detect service configuration changes begins at 602. At 604, the latest services list is obtained. At 606 service configuration changes are detected. The services with the configuration changes are added to the monitoring list 124 at 608. The service configuration changes can include but are not limited to, addition of new services or changes to existing services etc. At 610, it is further determined if any of the services are stopped. If no services are stopped, the method terminates on the end block and the monitoring system 100 waits for the next scheduled run. If it is determined at 610, that one or more services are stopped, the rules are applied to the stopped services at 612.

An example template of a Hawk rule that is automated in accordance with the examples disclosed herein for a Tibco™ Business Works (BW) server can include monitoring a Tibco™ BW service every minute. The rule may specify that if the service is down, to wait for one minute. If after one minute, the service is still down, to restart the service and notify the maintenance team.

Figure 7:
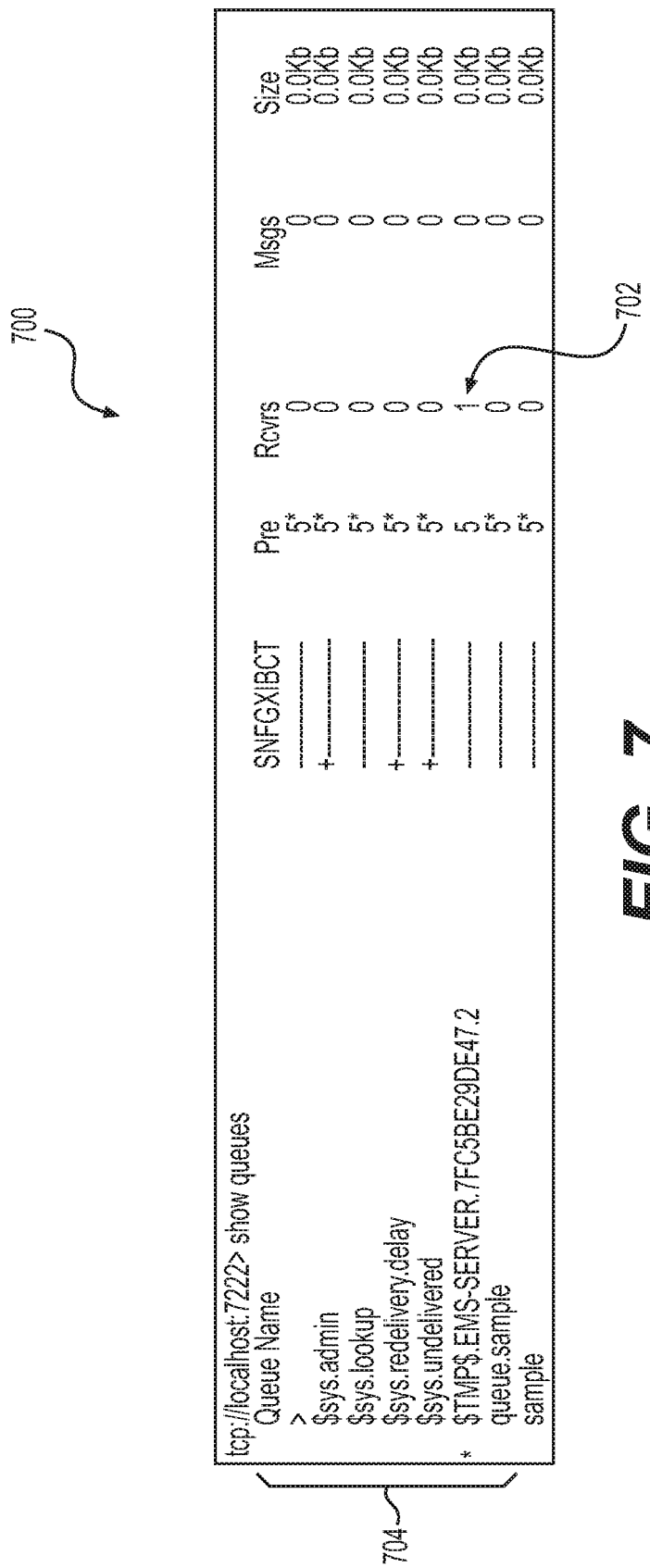
FIG. 7 shows an example command line interface including the message queues in accordance with the examples disclosed herein.

FIG. 7 shows an example command line interface 700 including the message queues in accordance with the examples disclosed herein. Eight messaging queues 704 are displayed on the command line interface 700. The messaging server 160 works on point-to-point and publish-subscribe messaging schemes. The monitoring system 100 not only monitors the message queue receivers such as the applications 152-156, but also monitors the messages in the message queues. A message can be sent by an external system to one of the messaging queues 704 of the messaging server 160. In the instances where the messaging server 160 is restarted, it may happen that the messaging connections to the services 1522-1564 are disconnected. For example, one message receiver 702 is connected to the sixth message queue. When the connection is lost due to restarting the messaging server 160, the services can be restarted by the MSC validator 102 in order to re-establish the connections.

Figure 8:
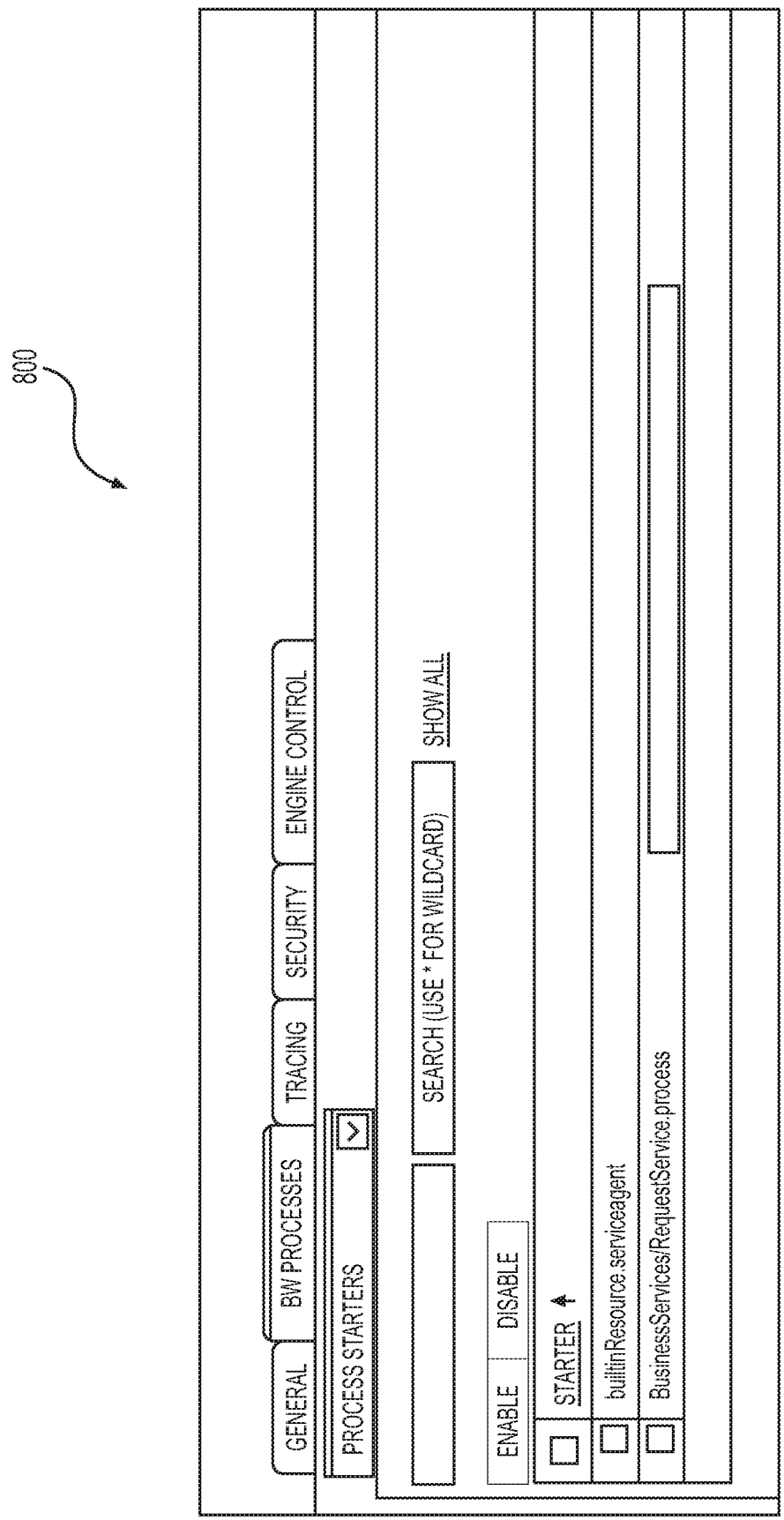
FIG. 8 shows an administrative graphical user interface (GUI) that lists the process starters that are currently running under a service in accordance with the examples disclosed herein.

FIG. 8 shows an administrative GUI 800 that lists the process starters that are currently running under a service in accordance with the examples disclosed herein. A list of process starters is shown in the administrative GUI 800 for a particular service. It is possible that when the service or the business works server 150 is restarted, all process starters may not come up properly or may show up in the disabled state. Instead of manually checking logs and process starters for each service, this tool automatically compares it with a predefined state for all the services. The process starter validator 104 therefore saves the manual effort in finding issues and eliminates the possibility of human errors in monitoring one or more of the business works server 150 and/or the messaging server 160.

Figure 9:
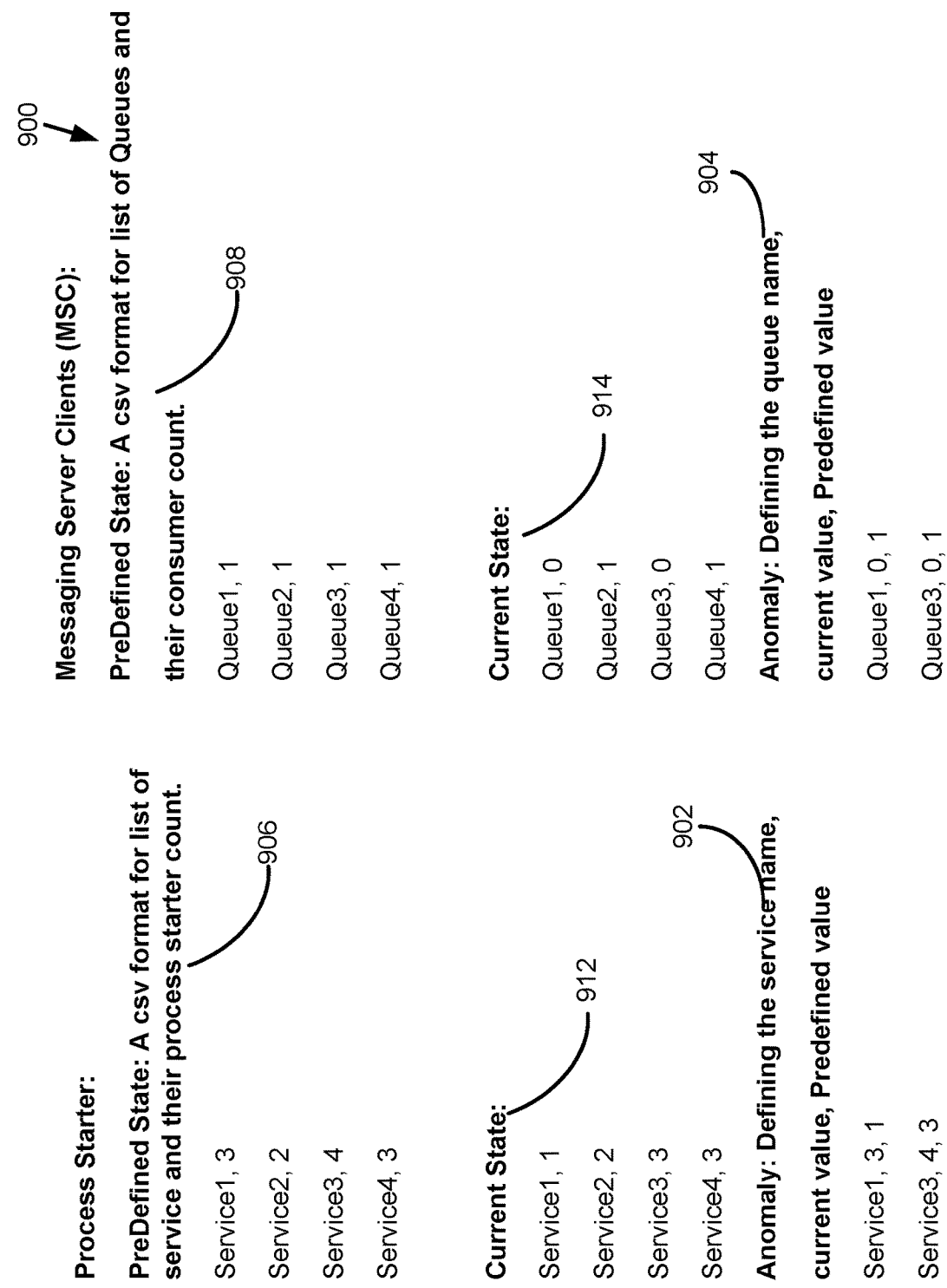
FIG. 9 shows example standard states, current states and anomalies that are detected in accordance with the examples disclosed herein.

FIG. 9 shows examples 900 of process starter anomalies 902 and MSC anomalies 904. The standard state 906 of the process starters is defined in comma separated values (csv) format as a list of services and their process starter counts. The csv format for the standard state for messaging server clients 908 including the list of queues and their consumer count or count of message receivers can also be defined. Similar definitions are used for the current states of the process starters 912 and the MSCs 914. The current states of the process starters 912 include the services that are currently running and the number of process starters which started normally. Accordingly, the current states of the process starters for Service 1 include one process starter, Service 2 includes two process starters, Service 3 includes three process starters and Service 4 also includes three process starters. The current states of the queues include Queue 1 with 0 consumers or message receivers, Queue 2 with 1 message receiver, Queue 3 with 0 message receivers and Queue 4 with 1 message receiver. When the current state of Service 1 is compared with the standard state, it may be noted that the current value is 1 whereas the predefined value is 3 and hence a process starter anomaly is noted for Service 1. A process starter anomaly can also be noted for Service 4 where the current value is 4 while the predefined value is 3. Similarly, comparisons between the current states 914 and the predefined states of the MSCs show that anomalies exist for Queue 1 which has 0 message receivers or consumers in the current state when it should have had 1 message receiver per the standard state. Queue 3 also shows an anomaly between the number of current message receivers versus the message receivers defined in the standard state.

It may be noted that the particular formats for defining the standard states, the current states and the anomalies are shown herein for illustrative purposes only and are not limiting. Other formats or notations can be employed for defining the standard states, current states and anomalies for the process starters and the MSCs in accordance with the examples disclosed herein.

Figure 10:
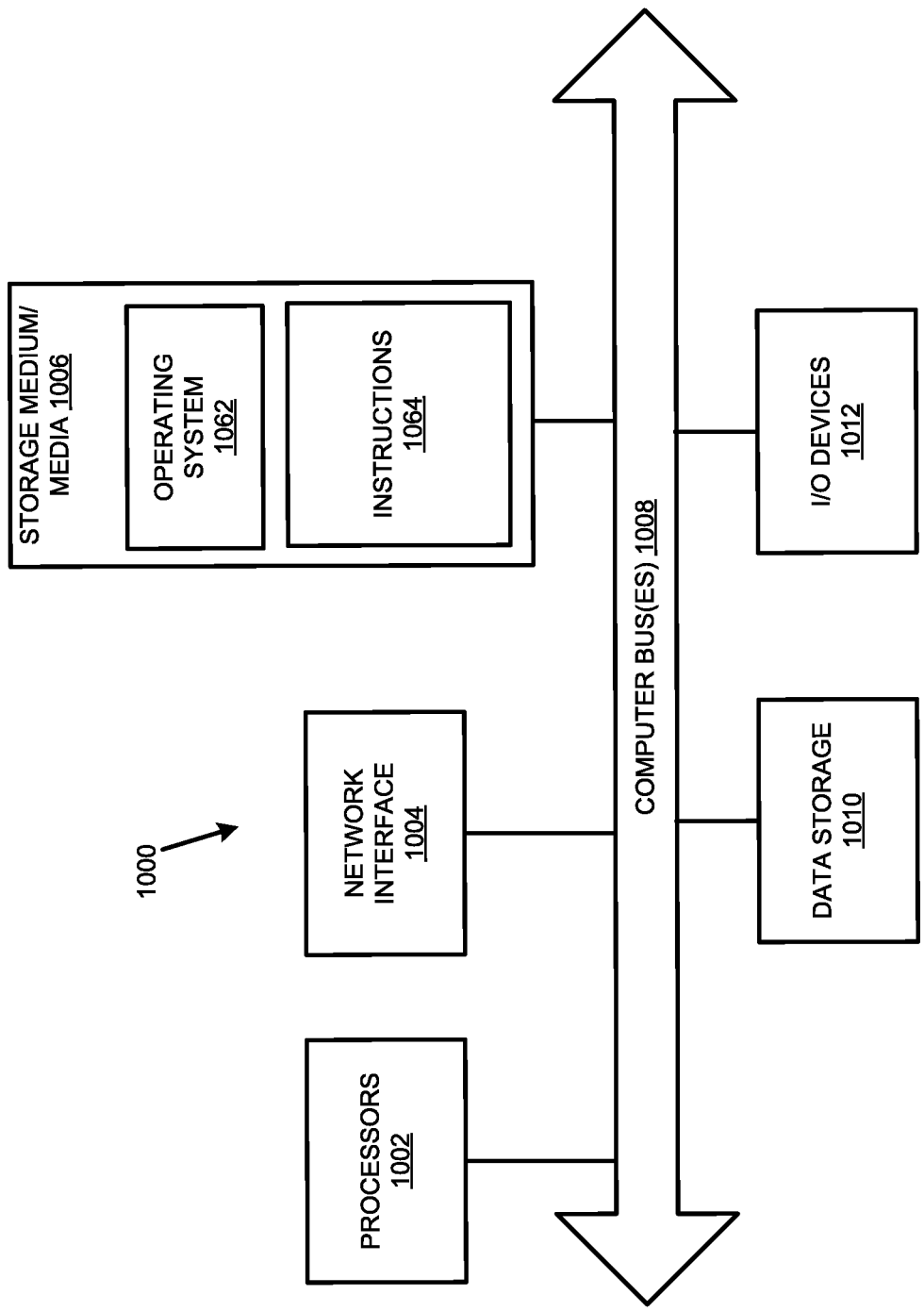
FIG. 10 illustrates a computer system that may be used to implement the application monitoring system in accordance with the examples disclosed herein.

FIG. 10 illustrates a computer system 1000 that may be used to implement the monitoring system 100. More particularly, computing machines such as desktops, laptops, smartphones, tablets and wearables which may be used to generate or access the data from the monitoring system 100 may have the structure of the computer system 1000. The computer system 1000 may include additional components not shown and that some of the process components described may be removed and/or modified. In another example, a computer system 1000 can sit on external-cloud platforms such as, Amazon Web Services, AZURE cloud or internal corporate cloud computing clusters, or organizational computing resources, etc.

The computer system 1000 includes processor(s) 1002, such as a central processing unit, ASIC or other type of processing circuit, input/output devices 1012, such as a display, mouse keyboard, etc., a network interface 1004, such as a Local Area Network (LAN), a wireless 802.11x LAN, a 3G or 4G mobile WAN or a WiMax WAN, and a computer-readable medium 1006. Each of these components may be operatively coupled to a bus 1008. The computer-readable medium 1006 may be any suitable medium which participates in providing instructions to the processor(s) 1002 for execution. For example, the processor-readable medium 1006 may be non-transitory or non-volatile medium, such as a magnetic disk or solid-state non-volatile memory or volatile medium such as RAM. The instructions or modules stored on the processor-readable medium 1006 may include machine-readable instructions 1064 executed by the processor(s) 1002 to perform the methods and functions of the monitoring system 100.

The monitoring system 100 may be implemented as software stored on a non-transitory processor-readable medium and executed by the one or more processors 1002. For example, the processor-readable medium 1006 may store an operating system 1062, such as MAC OS, MS WINDOWS, UNIX, or LINUX, and code 1064 for the monitoring system 100. The operating system 1062 may be multi-user, multiprocessing, multitasking, multithreading, real-time and the like. For example, during runtime, the operating system 1062 is running and the code for the monitoring system 100 is executed by the processor(s) 1002.

The computer system 1000 may include a data storage 1010, which may include non-volatile data storage. The data storage 1010 stores any data used by the monitoring system 100. The data storage 1010 may be used to store the current states of the process starters, MSCs, rule templates, generated rules and the like.

The network interface 1004 connects the computer system 1000 to internal systems for example, via a LAN. Also, the network interface 1004 may connect the computer system 1000 to the Internet. For example, the computer system 1000 may connect to web browsers and other external applications and systems via the network interface 1004.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims and their equivalents.

What is claimed is:

1. An application health monitoring system comprising:
at least one processor;
a non-transitory processor-readable medium storing machine-readable instructions that cause the at least one processor to:
receive data regarding one or more messaging server clients (MSCs) serviced by a messaging server,
the messaging server supplying the MSCs with messages,
the MSCs including a plurality of applications, and
the applications comprising one or more services;
obtain a MSC comparison report,
the MSC comparison report providing comparisons of current states of each of the MSCs with a standard state;
identify one or more MSC anomalies from the comparison report,
the MSC anomalies signifying disconnected sessions with at least one of the MSCs;
restart at least one of the services associated with the disconnected sessions;
generate another MSC comparison report,
the another MSC comparison report providing comparisons of the current states of each of the MSCs with the standard state after the at least one service is restarted;
determine if a MSC validation stop condition is present,
the MSC validation stop condition including validation of the at least one MSC, and
the validating of the at least one MSC performed via establishing connections with the at least one MSC;
prevent, when the consumer validation stop condition is present, performing the steps of:
accessing the MSC comparison report,
identifying the one or more MSC anomalies,
restarting at least one of the services, and
generating another MSC comparison report; and
validate one or more process starters included in the services upon the validation of the at least one MSC, wherein the validation of the one or more process starters includes an automatic comparison of current attribute values of the one or more process starters with respective standard states that include attribute values to be maintained for a stable environment at the MSC.

2. The application health monitoring system of claim 1, where the instructions for validating the process starters further comprise instructions that cause the processor to:
detect process starter anomalies between the current states and the respective standard states; and
restart the services including the process starters associated with the process starter anomalies.

3. The application health monitoring system of claim 2, where the instructions for validating the process starters further comprise instructions that cause the processor to:
repeating the steps of comparing the current states, detecting the process starter anomalies and restarting the services until a process starter validation stop condition is reached.

4. The application health monitoring system of claim 3, where the process starter validation stop condition further includes one of resolution of the process starter anomalies and repeating the steps of accessing the comparison report, identifying the one or more process starter anomalies, restarting at least one of the services and generating another comparison report at least three times.

5. The application health monitoring system of claim 3, further comprising instructions that cause the processor to:

flag the process starter anomalies for human review if the process starter anomalies persist even after restarting the at least one of the services at least three times.

6. The application health monitoring system of claim 1, where the MSC validation stop condition further includes repeating the steps of accessing the MSC comparison report, identifying the one or more MSC anomalies, restarting a server including the plurality of applications and generating another MSC comparison report at least three times.

7. The application health monitoring system of claim 6, where the processor-readable medium stores further instructions that cause the processor to:
flag the anomalies for human review if the MSC anomalies persist even after restarting the server at least three times.

8. The application health monitoring system of claim 1, where process starters include one or more of web services and queue receivers.

9. The application health monitoring system of claim 1, where the processor-readable medium stores further instructions that cause the processor to:
provide one or more user interfaces that receive data regarding the standard states of the process starters.

10. The application health monitoring system of claim 1, where the processor-readable medium stores further instructions that cause the processor to:
receive data regarding addition of one or more new services associated with the plurality of applications.

11. The application health monitoring system of claim 10, where the processor-readable medium stores further instructions that cause the processor to:
automatically implement rules existing for the services to the one or more new services.

12. The application health monitoring system of claim 1, where the one or more services include at least a web service the processor-readable medium stores further instructions that cause the processor to:
validate the web service via automatically connecting to a specific server and port number.

13. A method of monitoring application health comprising:
validating one or more messaging server clients (MSCs) serviced by a messaging server, the MSCs include a plurality of applications and one or more services associated with the plurality of applications;
validating one or more process starters upon validating the MSCs, the validation of the process starters includes:
comparing current attribute values of one or more process starters with respective predefined standard states of the process starters that include attribute values to be maintained for a stable environment at the MSCs;
detecting process starter anomalies between the current states of the process starters and the respective standard states;
restarting the services including the process starters associated with the process starter anomalies;
determine a process starter validation stop condition is reached where the process starter validation stop condition includes resolution of the process starter anomalies;
preventing, if the process starter validation stop condition is reached, recurrence of the steps of comparing the current states of the process starters, detecting the process starter anomalies and restarting the services; and
flagging the anomalies for human review if the process starter anomalies persist even after restarting the at least one of the services at least multiple times.

14. The method of claim 13, where validating the one or more MSCs further comprises:
identify one or more MSC anomalies from a MSC comparison report, the MSC anomalies signifying disconnected sessions with at least one of the MSCs;
restart at least one of the services associated with the disconnected sessions; and
generate another MSC comparison report providing the current states of each of the MSCs after at least one service is restarted.

15. The method of claim 14, where validating the one or more MSCs further comprises:
repeat steps of accessing the MSC comparison report, identifying the one or more MSC anomalies, restarting at least one of the services and generating another MSC comparison report until a MSC validation stop condition is reached, the MSC validation stop condition includes validation of the at least one MSC via establishment of connections with the at least one MSC.

16. The method of claim 13, further comprising:
accessing a respective predefined standard state for each of the process starters.

17. A non-transitory processor-readable storage medium comprising processor-readable instructions that cause a processor to:
receive data regarding one or more messaging server clients (MSCs) serviced by a messaging server,
the messaging server supplying the MSCs with messages,
the MSCs including a plurality of applications, and
the applications comprising one or more services;
obtain a MSC comparison report,
the MSC comparison report providing comparisons of current states of each of the MSCs with a standard state;
identify one or more MSC anomalies from the comparison report,
the MSC anomalies signifying disconnected sessions with at least one of the MSCs;
restart at least one of the services associated with the disconnected sessions;
generate another MSC comparison report,
the another MSC comparison report providing comparisons of the current states of each of the MSCs with the standard state after at least one service is restarted;
determine if a MSC validation stop condition is present, the MSC validation stop condition including validation of the at least one MSC, and
the validating of the at least one MSC performed via establishing connections with the at least one MSC;
prevent, when the consumer validation stop condition is present, performing the steps of:
accessing the MSC comparison report,
identifying the one or more MSC anomalies,
restarting at least one of the services, and
generating another MSC comparison report; and
validate one or more process starters included in the services upon the validation of the at least one MSC, wherein the validation of the one or more process starters includes an automatic comparison of current attribute values of the one or more process starters with respective standard states that include attribute values to be maintained for a stable environment at the MSC.

18. The non-transitory processor-readable storage medium of claim 17, comprising further instructions that cause the processor to:
- identify changes to service configurations via accessing a list of services;
- add the changes to a monitoring list;
- identify stopped services from the monitoring list; and
- implement one or more rules for the stopped services.

19. The non-transitory processor-readable storage medium of claim 17, wherein the process starters include global classes that further comprise methods and variables that are initialized when corresponding services are started.

20. The non-transitory processor-readable storage medium of claim 17, wherein the respective standard states include one or more user-defined standard states.

* * * * *